United States Patent

Kokotailo et al.

[15] 3,640,680

[45] Feb. 8, 1972

[54] METHOD OF DECREASING THE POTASSIUM CONTENT OF POTASSIUM-CONTAINING ZEOLITES

[72] Inventors: George T. Kokotailo, Woodbury; Stephen L. Lawton, Sewell, both of N.J.

[73] Assignee: Mobil Oil Corporation

[22] Filed: Oct. 28, 1968

[21] Appl. No.: 771,701

[52] U.S. Cl. ..........................................23/111, 252/455 Z
[51] Int. Cl. ......................................................C01b 33/28
[58] Field of Search.................23/111, 112, 113; 252/455 Z

[56] References Cited

UNITED STATES PATENTS

| | | | |
|---|---|---|---|
| 2,950,952 | 8/1960 | Breck et al. | 23/113 |
| 3,140,251 | 7/1964 | Plank et al. | 252/455 |
| 3,402,996 | 9/1968 | Maher et al. | 23/112 |
| 3,375,065 | 3/1968 | McDaniel et al. | 23/112 |

FOREIGN PATENTS OR APPLICATIONS 6,607,456  11/1966  Netherlands............................23/113

OTHER PUBLICATIONS

Barrer "Chemical Society Journal" 1950 pp. 2342-2350
Eberly "The American Mineralogist" vol. 49, Jan.-Feb., 1964, pp. 30-40

*Primary Examiner*—Edward J. Meros
*Attorney*—Oswald G. Hayes, Andrew L. Gaboriault, Raymond W. Barclay and James F. Woods

[57] ABSTRACT

A method of decreasing the potassium content of a potassium zeolite containing calcium, such as erionite, which comprises calcining said zeolite and thereafter ion exchanging said zeolite with cations other than potassium. Potassium zeolites, such as zeolite-T, which do not contain calcium are ion exchanged with calcium cation prior to said calcining and ion exchanging. Catalytically active forms of the zeolite product are used in hydrocarbon conversion processes.

3 Claims, No Drawings

METHOD OF DECREASING THE POTASSIUM CONTENT OF POTASSIUM-CONTAINING ZEOLITES

BACKGROUND OF THE INVENTION

1. Field of the Invention

This invention relates to a method for decreasing the potassium content of potassium-containing zeolites. More particularly, this invention relates to a method for decreasing the potassium content of zeolites containing potassium in admixture with calcium.

2. Discussion of the Prior Art

Various shape selective zeolite catalysts have been prepared from naturally occurring zeolites of the erionite or offretite family. These zeolites can be converted into a catalytically active form by ion exchange which effectuates removal of a substantial portion of the sodium content therefrom. For some unexplainable reason, the potassium content cannot be readily decreased and thus the presence of potassium in the exchanged zeolite has a deleterious effect upon the catalytic properties of the zeolite since most zeolite catalysts preferably have a desired minumum content of alkali metal cations therein. The potassium content of erionite is especially difficult to reduce beneath a specific level without impairing the crystal structure of the zeolite. Thus, D. L. Peterson, F. Helferich, and G. C. Blytas have written in J. Phys. & Chem. of Solids 26, 835, (1965) that the potassium content of erionite cannot be reduced below the level of 0.5 mev./g. (1.95 percent) without destroying the crystal lattice.

It is an object of the present invention, therefore, to provide a method for decreasing the potassium content of erionite and related zeolites in a method which does not adversely affect the crystal lattice and in which the potassium content is decreased to a level beneath 1.95 weight percent. It should be mentioned that naturally occurring samples of erionite contain some quantities of calcium.

SUMMARY OF THE INVENTION

Broadly, this invention contemplates a method of decreasing the potassium content of a potassium zeolite containing calcium which comprises calcining said zeolite and thereafter ion exchanging said zeolite.

In a particularly desirable embodiment, this invention contemplates a method of decreasing the potassium content of a potassium zeolite initially free of calcium which comprises calcining said zeolite, contacting said zeolite with a molten calcium salt or aqueous calcium salt solution, calcining the so contacted zeolite and thereafter ion exchanging said zeolite. The present invention also contemplates a new zeolite prepared by the above method having a composition, expressed in terms of mole ratios of oxides, as follows:

$1.1 \pm 0.4[(xM_2O/n):(1-x)K_2O]:Al_2O_3:6-8\ SiO_2:0-8\ H_2O$ wherein M is calcium, $n$ is the valence of M, $x$ is any value between 0.01 and 0.99 and having the characteristic diffraction pattern of table 1 below. Generally the zeolite has a potassium content of less than 1.95 weight percent.

DESCRIPTION OF SPECIFIC EMBODIMENTS

The method of the present invention is particularly applicable to shape-selective zeolites of natural origin containing calcium therein, but it is to be understood that synthetic zeolites such as zeolite-T can also be treated in accordance with the present method to have the potassium content reduced so that the cation sites can be filled by cations having catalytic activity. In the case of treating zeolites containing calcium, the zeolite is calcined which calcination appears to remove the potassium from the small cages of the zeolite by migration of the calcium within the zeolite. Subsequent ion exchange with an aqueous solution of an exchanging salt or, preferably with a molten calcium salt removes the potassium in exchange for the cation of the salt. Subsequent to calcination, the calcium is believed to occupy the small cages of the zeolite previously occupied by potassium. Potassium which has moved into the large cages is removed by ion exchange readily since, in those positions, the potassium is available for ion exchange in accordance with known techniques.

In treating zeolites which do not contain calcium, such as zeolite-T, the zeolite is initially calcined and then calcium exchanged, preferably, with a molten calcium salt. After the calcium exchange or treatment, the zeolite is once again calcined to effect the theorized calcium-potassium migration and to displace the potassium from the small cages of the zeolite into the larger cages. Thereafter, the zeolite is ion exchanged with a cation which exchanges with the potassium now in the larger cages of the zeolite. Preferably, this second ion exchange is with a calcium salt, preferably a molten calcium salt as this facilitates reduction of the potassium content in the zeolite.

The effect of the calcination and ion exchange of a calcium zeolite is considered particularly unexpected and surprising. The reason for the ready removal of potassium by the manipulative procedures of the present procedure is not fully understood especially considering the respective atomic radii of the potassium and calcium atoms. Specifically, the potassium atom has an atomic radius of 2.31 angstroms whereas the calcium atom has an atomic radius of 1.97 angstroms. Nevertheless, the experimental data reveal that the calcium atom during calcination apparently forces the potassium atoms, as cations, out of the small cages of the zeolite and into the larger cages where they are readily removed by ion exchange.

Using the method of the present invention, the potassium content of naturally occurring erionite can be reduced to a level as low as 0.23 weight percent after several exchanges following calcination of a calcium-containing zeolite. The reduction in the potassium content does not detrimentally affect the zeolite structure of the crystal lattice. Preferably, after the initial calcination of the zeolite, the zeolite is exchanged and calcined several times with a suitable salt. Representative salts used in molten form include ammonium acetate, ammonium sulfate and ammonium thiocyanate. Representative salts used in aqueous solution form include ammonium chloride, ammonium bromide, ammonium carbonate and other ammonium salts. Representative metal salts used in molten form include silver nitrate, silver bromide, calcium bromide hydrate, calcium chloride hydrate, beryllium basic acetate, beryllium sulfide, beryllium nitrate, magnesium carbonate hydrate, magnesium nitrate hydrate, manganese chloride hydrate, manganese sulfate hydrate, zinc nitrate, zinc acetate, zinc chloride, aluminum nitrate, chromic chloride, lanthanum nitrate hydrate, samarium nitrate hydrate, copper sulfate and mercury nitrate. Representative metal salts used in aqueous solution form include salts of rare earth metals, silver acetate, silver citrate, calcium arsenate, calcium benzoate, calcium carbonate, calcium citrate, beryllium bromide, beryllium carbonate, beryllium sulfate, barium bromide, barium carbonate, barium citrate, magnesium bromide, magnesium sulfate, magnesium acetate, manganese acetate, zinc sulfate, aluminum acetate, aluminum citrate, titanium chloride, zirconium chloride, zinconium sulfate, chromic acetate, ferric chloride, ferric acetate, ferrous chloride, nickel chloride, cerous bromide, lanthanum chloride, lanthanum sulfate, yttrium bromide, samarium acetate, samarium chloride, samarium sulfate. A particularly suitable sodium salt is sodium acetate hydrate. The subsequently employed ion exchange salt solutions are preferably in a concentrated form as in the form of a molten salt containing water of hydration. The extent of the reduction in the potassium content is generally a function of the number of exchanges to which the zeolite is subjected following calcination of the zeolite after it contains calcium.

It is essential in the process of the present invention that the calcium be present either by introduction through a treatment of the zeolite or present by virtue of occurring in the naturally occurring zeolite. Calcium salts which can be employed to contact zeolites which do not have any naturally occurring calcium therein include calcium nitrate tetrahydrate and calcium chloride hexahydrate.

The calcination is generally performed at a temperature of at least about 400° C. for at least 2 hours although calcination is a time-temperature relation and it is possible under certain circumstances to calcine at a somewhat lower temperature to cause the desired migration of the calcium in the zeolite into the small cages of the zeolite to force the potassium out to a position where it is available for subsequent ion exchange.

The resultant zeolite is a novel crystalline aluminosilicate which can be identified by its X-ray diffraction pattern. The X-ray diffraction pattern of the zeolite is set forth in Table 1 below:

Table 1

| d (obs) | $I/I_o$ | $2\theta$ | d (obs) | $I/I_o$ | $2\theta$ |
|---------|---------|-----------|---------|---------|-----------|
| 11.45   | 100     | 7.72      | 3.49    | 21      | 25.52     |
| 9.05    | 8       | 9.77      | 3.31    | 21      | 26.93     |
| 7.33    | 14      | 12.08     | 3.24    | 9       | 27.52     |
| 6.62    | 38      | 13.37     | 3.21    | 5       | 27.80     |
| 6.18    | 2       | 14.34     | 3.18    | 1       | 28.02     |
| 5.72    | 21      | 15.48     | 3.09    | 12      | 28.90     |
| 5.53    | 1       | 16.03     | 2.92    | 8       | 30.63     |
| 5.34    | 18      | 16.60     | 2.87    | 30      | 31.19     |
| 4.51    | 18      | 19.70     | 2.81    | 40      | 31.85     |
| 4.33    | 49      | 20.49     | 2.80    | 35      | 31.95     |
| 4.16    | 34      | 21.38     | 2.67    | 9       | 33.55     |
| 3.82    | 21      | 23.28     | 2.51    | 14      | 35.75     |
| 3.73    | 46      | 23.85     | 2.48    | 8       | 36.27     |
| 3.66    | 4       | 24.30     |         |         |           |

These values were determined by standard techniques employing a scan speed of 1½ per minute. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak and $d$ (obs), the interplanar spacing in angstroms, corresponding to the recorded lines, where calculated.

Preferably, the alkali metal content, especially the sodium, is exchanged out of the composition for another cationic form as the sodium form of the zeolite tends to be less catalytically active and stable than other forms. The sodium and/or potassium can be largely removed from the aluminosilicate by ion exchange. The sodium and/or potassium cations can be exchanged for hydrogen ions by treating the aluminosilicate with acids. Alternatively, it can be treated with a source of ammonium, alkylammonium, or arylammonium cation providing steric hindrances do not prevent the cation from entering the cages of the zeolite. If the sodium and/or potassium is replaced for an ammonium cation or complex, the hydrogen form is prepared therefrom by heating the composition at a temperature above about 400° F. causing evolution of ammonia and retention of a proton in the composition at the site previously occupied by the ammonium ion.

Other replacing cations include cations of the metals of groups IA other than sodium and potassium, IB–VIII of the periodic table; especially metals of groups II and III, including the rare earth metals, tin, lead, group IVB comprising titanium, zirconium, and hafnium; metals of the actinide series, antimony, bismuth, chromium; also group VIIIB and group VIII. Regardless of the cations replacing the sodium or potassium in the synthesized form of the composition, the spatial arrangement of the aluminum, silicon and oxygen atoms which form the basic crystal lattice of this material, remains essentially unchanged by the described replacement of sodium or potassium as determined by X-ray diffraction analysis of the ion-exchanged material. One exception is in calcium exchange which causes the $C_o$ lattice parameter to shrink.

Ion exchange of the zeolite can be accomplished conventionally by contacting the zeolite with a solution, suitably an aqueous solution, of a salt of the exchanging cation. Additionally, the composition can undergo solid-state exchange to remove sodium or potassium and substitute another cation therefor. Preferably, an exchange with a calcium salt is employed which may be followed by exchange with another cation.

While water will ordinarily be the solvent in the base exchange solutions employed, it is contemplated that other solvents, although generally less preferred, can be used in which case it will be realized that the above list of exchange compounds can be expanded. Thus, in addition to an aqueous solution, alcohol solutions and the like of the exchange compounds can be employed in producing the exchanged catalyst of the present invention. Generally, the alkali metal content is reduced to less than 5 percent by weight and preferably less than 3 weight percent. When the exchanged aluminosilicate is prepared, it is generally, thereafter treated with a suitable solvent, e.g., water, to wash out any of the anions which may have become temporarily entrained or caught in the pores or cavities of the crystalline composition.

Catalytically active forms of the new zeolite can be incorporated with other materials, such as active and inactive inorganic materials, which function as a matrix for the new catalyst. These inorganic materials include naturally occurring clays and metal oxides. The latter can be either naturally occurring or in the form of gelatinous precipitates or gels including mixtures of silica and metal oxides. The inactive materials suitable serve, among other things, as diluents to control the amount of conversion in a given process so that the products can be obtained economically and orderly without employing other means for controlling the rate of reaction. The new zeolite can be incorporated into a naturally occurring clay, such as a kaolinite, which improves the crush strength of the catalyst and makes it more suitable in commercial operations. These inorganic oxide matrix materials function as binders for the zeolite. Naturally occurring clays which can be composited with the new catalyst include the montmorillonite and kaolin family, which families include the subbentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the catalyst also include inorganic oxides, notably alumina.

In addition to the foregoing materials, the catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. It can be formed as a cogel with one of these porous matrix materials. The relative proportions of finely divided novel crystalline aluminosilicate and inorganic oxide gel matrix vary widely with the crystalline aluminosilicate content ranging from about 5 to about 90 percent by weight and more usually, particularly when the composite is prepared in the form of beads in the range of about 5 to about 50 percent by weight of the composite.

The novel zeolite of this invention can contain a hydrogenation-dehydrogenation component, such as an oxide of a metal, a sulfide of a metal, or a metal of groups VI and VIII of the periodic table, and manganese. Representative elements which can be incorporated in the zeolite are cobalt, nickel, platinum, palladium, ruthenium, rhodium, osmium, iridium, chromium, molybdenum, and tungsten. The most preferred metals are platinum, palladium, nickel, zinc and cadmium. These materials either in their elemental form, as oxides, or sulfides can be impregnated into the zeolite or in cationic form can be exchanged into the zeolite for a sodium or potassium cation. The methods for impregnation and/or exchange are those commonly used in the art. These hydrogenation-dehydrogenation components can be intimately combined by other means, as by physical admixture. The resultant catalyst, especially in a form containing less than 4 percent by weight alkali metal, preferably less than 3 percent, is useful in hydrocracking and reforming as well as other processes involving hydrogenation or dehydrogenation.

Employing the catalyst of this invention, lighter petroleum stock and similar lower molecular weight hydrocarbons can be hydrocracked at temperatures between 400° and 825° F. using molar ratios of hydrogen to hydrocarbon charge in the range between 2 and 80. The pressure employed will vary between 10 and 2,000 p.s.i.g. and the liquid hourly space velocity between 0.1 and 10.

Employing a form of the catalyst not containing a hydrogenation-dehydrogenation component, the catalyst can be employed for catalytic cracking, using a liquid hourly space velocity between about 0.5 and 50, a temperature between about 550° and 1,200° F. and a pressure between subatmospheric and several hundred atmospheres.

Additionally, catalytically active forms of the zeolite of this invention find extensive utility in a wide variety of hydrocarbon conversion processes including hydroisomerization, hydrodealkylation, hydrodisproportionation, hydrocarbon oxidation, dehydrogenation, desulfurization, hydrogenation, hydrocracking, polymerization and the like provided, of course, that the reactant to undergo conversion can enter the pores of the zeolite and the product can be removed from within the zeolite.

In order to more fully illustrate the nature of the present invention and the manner of practicing the same, the following examples are presented:

EXAMPLE 1

A sample of a naturally occurring erionite zeolite having a composition as follows:

| | |
|---|---|
| SiO2 | 71.5 weight percent |
| Al2O3 | 14.9 |
| Fe2O3 | 2.6 |
| D2O | 4.6 |
| CaO | 2.4 |
| Na2O | 4.0 |
| MgO | 1.5 | was calcined in air for 4 hours at 575° C., cooled quickly and immediately treated with an excess of molten $Ca(NO_3)_2 \cdot 4H_2O$. The sample was allowed to stand overnight at 75° C. then washed in hot water and dried. The crystalline structure had changed as revealed by an X-ray diffraction pattern of the zeolite after then treated. The above treatment was repeated twice. Analysis of the so treated zeolite showed a potassium concentration of 0.82 weight percent and a calcium concentration of 7.01 weight percent. X-ray diffraction analysis revealed that the $C_o$ lattice parameter had decreased as revealed by the shift of the 104 line from a 2-theta angle of 25° to 25.5°. The material was a crystalline material in which there was no apparent destruction of the crystal. It sorbed 6.7 weight percent normal hexane determined at 25° C. and under a pressure of 20 mm. Hg.

EXAMPLE 2

Another sample of naturally occurring erionite having a composition as follows:

| | |
|---|---|
| SiO2 | 70.8 |
| Al2O3 | 16.3 |
| Fe2O3 | 1.6 |
| K2O | 5.2 |
| CaO | 3.3 |
| Na2O | 1.3 |
| MgO | 1.2 | was calcium exchanged as in Example 1. A portion of the exchanged material was once again calcined, calcium exchanged and a second portion was twice again calcined, and calcium exchanged in the manner of Example 1. Analysis of the thrice-calcined and -exchanged sample revealed a potassium concentration of 0.44 weight percent and a calcium concentration of 6.06 weight percent. The normal hexane absorption of the thrice-calcined and calcium-exchanged erionite was 7.2 weight percent determined at 25° C. and under a pressure of 20 mm. Hg.

EXAMPLE 3

A sample of the naturally occurring erionite employed in Example 1 was calcined for 2 hours at 500° C., cooled rapidly and an excess of molten $Ca(NO_3)_2 \cdot 4H_2O$ was immediately added and allowed to stand for about 18 hours at 75° C. The sample was washed in hot water and dried. The above process was repeated twice and the resultant zeolite was analyzed. It showed a potassium concentration of 0.44 weight percent and a calcium concentration of 6.21 weight percent. The resultant zeolite was crystalline and there was no apparent destruction of the crystalline material.

EXAMPLE 4

A sample of the erionite employed in Example 2 was calcium exchanged three times the same way as described above in Example 3. Elemental analysis of the so treated zeolite showed a concentration of 0.44 weight percent potassium and 6.08 weight percent calcium.

EXAMPLE 5

A sample of the naturally occurring erionite employed in Example 1 was calcined for 2 hours at 500° C., cooled rapidly and an excess of molten sodium acetate, i.e., $CH_3COONa \cdot 3H_2O$ was added and allowed to stand for about 18 hours at 75° C. The sample was washed in hot water and dried. The above process was repeated twice. An analysis of the sample showed a concentration of 6.5 weight percent sodium and 0.23 weight percent potassium.

EXAMPLE 6

A sample of the naturally occurring erionite employed in Example 2 was sodium exchanged three times as described in Example 5. An analysis of this sample showed a concentration of 7.5 weight percent sodium and 0.26 weight percent potassium.

EXAMPLES 7 and 8

A sample of zeolite-T prepared in accordance with U.S.P. 2,950,952 was treated in accordance with Examples 5 and 6. Potassium content was observed to be 3.1 weight percent potassium and 6.4 weight percent sodium. However when the sample was treated with calcium nitrate tetrahydrate and then ammonium exchanged three times, the potassium content was significantly reduced without collapse of the crystal to 0.39 weight percent potassium. It is thus theorized that calcium is necessary for the reduction of the potassium content and that by merely employing calcination and exchange at high temperatures with other salts does not lower the potassium content to below 2 percent.

It should be mentioned that once the potassium content has been replaced by calcium that calcium ions can be readily exchanged in and out of the zeolite in accordance with known techniques for ion exchange. Thus, when the potassium is removed from the zeolite, the ion exchange resistance of the cations in the site originally occupied by the potassium is no longer evident.

From the foregoing, it is apparent that the method of the present invention is effective to substantially reduce the potassium content of erionite and similar type zeolites including especially zeolite-T and offretite in a manner which does not cause the crystal to collapse and which reduces the potassium content to an amount substantially less than that heretofore believed possible. The resultant zeolite is useful in catalysis especially in shape-selective catalysis and is often useful as an absorbent or desiccant.

The terms and expressions used herein have been used as terms of illustration and not of limitation, as there is no intention, in the use of such terms and expressions, of excluding any equivalents, or portions thereof, as many modifications and departures are contemplated within the scope of the invention claimed.

We claim:

1. A method of decreasing the potassium content of a natural potassium zeolite containing calcium which comprises initially calcining said zeolite at a temperature of at least 400° C. and thereafter ion exchanging said zeolite with a molten calcium salt and repeating said calcining and ion exchanging until the potassium content is less than 1.95 weight percent.

2. A method of decreasing the potassium content of a potassium zeolite free of calcium which comprises ion exchanging said zeolite with a molten calcium compound, calcining the so exchanged zeolite at a temperature of at least 400° C., ion exchanging said zeolite with a molten salt of calcium capable of entering the pores of said zeolite and repeating said calcining and ion exchanging until the potassium content is less than 1.95 weight percent.

3. A method of decreasing the potassium content of a potassium zeolite free of calcium which comprises ion exchanging said zeolite with a molten calcium compound, calcining the so exchanged zeolite at a temperature of at least 400° C., ion exchanging said zeolite with a cation other than potassium capable of entering the pores of said zeolite, and repeating said calcining and ion exchanging until the potassium content is less than 1.95 weight percent.

* * * * *

PO-1050
(5/69)

UNITED STATES PATENT OFFICE
CERTIFICATE OF CORRECTION

Patent No. 3,640,680          Dated February 8, 1972

Inventor(s) George T. Kokotailo and Stephen L. Lawton

It is certified that error appears in the above-identified patent and that said Letters Patent are hereby corrected as shown below:

Column 3, line 34        "1 1/2 per minute" should read --1/2 degree per minute--

Column 3, line 65        "Group VIIIB" should read --Group VIIB--

Column 5, line 39        "$D_2O$" should read --$K_2O$--

Signed and sealed this 27th day of June 1972.

(SEAL)
Attest:

EDWARD M. FLETCHER, JR.          ROBERT GOTTSCHALK
Attesting Officer                 Commissioner of Patents